United States Patent [19]

Dombro

[11] Patent Number: 4,476,243

[45] Date of Patent: * Oct. 9, 1984

[54] OLEFIN POLYMERIZATION CATALYST AND CATALYST SUPPORT

[75] Inventor: Robert A. Dombro, Palatine, Ill.

[73] Assignee: Chemplex Company, Rolling Meadows, Ill.

[*] Notice: The portion of the term of this patent subsequent to Jul. 21, 1998 has been disclaimed.

[21] Appl. No.: 501,779

[22] Filed: Jun. 7, 1983

Related U.S. Application Data

[60] Continuation-in-part of Ser. No. 359,002, Mar. 17, 1982, abandoned, which is a continuation of Ser. No. 224,465, Jan. 12, 1981, abandoned, which is a division of Ser. No. 141,570, Apr. 18, 1980, Pat. No. 4,279,780.

[51] Int. Cl.³ .................... B01J 21/06; B01J 23/26
[52] U.S. Cl. .................................... 502/236; 502/256
[58] Field of Search ............... 502/236, 239, 242, 256

[56] References Cited

U.S. PATENT DOCUMENTS 3,120,483  2/1964  Hansford et al. ............... 502/236 X
3,950,316  4/1976  Witt ................................. 423/338 X
4,279,780  7/1981  Dombro ............................... 526/106

*Primary Examiner*—Carl F. Dees
*Attorney, Agent, or Firm*—Wood, Dalton, Phillips, Mason & Rowe

[57] ABSTRACT

Catalysts prepared from large pore volume zirconia-silica catalyst supports and a method of polymerizing olefins comprising contacting an olefin or mixture of olefins with the catalysts. The supports are prepared by reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH equal to at least 11, then adding an acidic solution to a pH of about 5-9 to produce a hydrocogel. The hydrocogel is then aged and washed free of soluble by-products with an aqueous liquid. Water is removed from the washed hydrocogel by azeotropic distillation or by washing with a water miscible solvent, then residual water is removed by chemically reacting this water with a ketal of the formula $RC(OR)_2R$ where R is the same or different and is an alkyl group of 1-5 carbon atoms, and then calcining the resulting xerocogel.

16 Claims, No Drawings

OLEFIN POLYMERIZATION CATALYST AND CATALYST SUPPORT

CROSS-REFERENCE TO RELATED APPLICATIONS

This application is a continuation-in-part of copending application Ser. No. 359,002 filed Mar. 17, 1982, now abandoned which is a continuation of application Ser. No. 224,465 filed Jan. 12, 1981, now abandoned which is a division of application Ser. No. 141,570, filed Apr. 18, 1980, now U.S. Pat. No. 4,279,780.

BACKGROUND OF THE INVENTION

According to this invention, olefin polymerization catalysts are prepared from supports comprising large pore volume xerogels or xerocogels. Some of the xerogels and xerocogels possess improved thermal stability. Chromium(II), chromium(III) or chromium(VI) compounds based on these supports are catalysts that are capable of producing polyethylene resins of melt index greater than about eight.

The improved large pore volume zirconia-silica catalyst supports are prepared by reacting a particular zirconium compound with a particular silicate to produce a hydrocogel, aging the hydrocogel, washing the hydrocogel, removing water from the resulting washed hydrocogel to produce a xerocogel either by azeotropic distillation or by leaching with a water miscible solvent, after which residual water is removed by chemically reacting this water with a ketal of the above formula $RC(OR)_2R$, and then calcining the resulting xerocogel.

Another object of the invention is to provide a method of polymerizing olefins comprising contacting the olefins with a catalyst comprising the above support and a chromium compound associated with it under polymerizing conditions.

The following prior art is believed to be the most pertinent:

Aboutboul et al U.S. Pat. No. 3,978,002 discloses a chromium(VI)oxide olefin polymerization catalyst comprising a silica xerogel support obtained by dehydrating the corresponding hydrogel by extraction with acetone. A polymerization process using such a catalyst support for the production of ethylene polymers produces polyethylene resins having relatively low molecular weights and, therefore, high melt index in the range 3.2–4.2 (obtained without hydrogen modification).

Bachl et al U.S. Pat. No. 4,042,770 relates to a process for the manufacture of olefin polymers with the aid of a specially prepared silica-chromium(VI)oxide catalyst. The specially prepared silica hydrogel is dehydrated by extraction with an organic liquid selected from $C_1-C_4$ alkanols and/or $C_3-C_5$ alkanones (ketones) until the organic liquid absorbed no more water. The dehydrated gel is then freed of organic liquid by drying at 120° C. to give the final xerogel. Doping with chromium(VI)oxide and air activation resulted in catalysts which produced ethylene polymers with very low melt index.

Short et al U.S. Pat. No. 4,081,407 describes a method for treating a hydrocogel consisting of coprecipitated silicatitania, 2.5 wt.% titanium (U.S. Pat. Nos. 3,950,316 and 3,862,104), with a saturated aliphatic alcohol selected from the group consisting of 1-pentanol, 3-methyl-1-butanol, 4-methyl-2-pentanol, 2,2-dimethyl-1-propanol, and 1-hexanol to remove water azeotropically or by extraction. The dried product retains a porous structure and is particularly suitable upon impregnation with a polymerization catalyst component, such as chromium(VI)oxide, for use in promoting the production of ethylene polymers of melt index in excess of about 6.6 (highest value disclosed is 7.5). These inventors discovered that the specific solvents disclosed removes water from the hydrocogels and affects the melt index of the polymer produced in polymerization reaction using catalysts supported on these strata.

Hwang et al U.S. Pat. No. 4,128,500 discloses chromium(III)acetylacetonate type catalysts. Dombro et al patent No. 4,246,137, the disclosure of which is hereby incorporated by reference, describe novel methods of preparing zirconia-silica xerocogels. Both are assigned to the assignee hereof.

SUMMARY OF INVENTION

With the catalyst and method of polymerizing of this invention polyethylene resins of melt index in excess of about eight are easily produced without the use of hydrogen during the synthesis. This improvement is attributed to the ability of a ketal to scavenge, and irreversibly chemically react, with water within the pores of the hydrogel or hydrocogel, thereby leaving behind a stable highly porous structure. In other words, the inventive process to remove water can clearly affect the melt index of the resulting polymer produced in polymerization reactions using catalysts, especially chromium(II), chromium(III) or chromium(VI) compound types, supported on strata produced from a hydrogel or hydrocogel, especially a zirconia-silica hydrocogel. Melt indices greater than about eight are not easily achieved by conventional particle form ethylene polymerization processes employing a chromium-containing catalyst system in the absence of hydrogen during resin synthesis.

A further advantage of this invention resides in the fact that the by-products from the chemical reaction of a ketal with water may be used to remove bulk water (up to about 90%), after which the leached product is contacted in a separate compartment with pure ketal in order to chemically remove the residual water.

The ketal may also be easily applied, via vaporization through a fluid bed, to remove physisorbed water from conventional commercial porous supports.

DESCRIPTION OF THE PREFERRED EMBODIMENTS

The invention provides a method for treating a hydrogel or hydrocogel with a water-miscible ketone, alcohol, or mixtures thereof to facilitate removal of bulk water followed by treating the resulting partially dehydrated hydrogel or hydrocogel with a ketal of the formula $RC(OR)_2R$ in which each R is an alkyl group of 1-5 carbon atoms and the R groups are the same or different. This completely removes residual water irreversibly by a chemical reaction. Of course, bulk and residual water can, if desired, be removed exclusively and irreversibly through chemical reaction with the ketal alone. A xerogel or xerocogel with a porous structure is obtained. These find utility as polyolefin catalyst supports, promoting the production, for example, of ethylene polymers with high melt index.

The resulting supports are, in general, suited for chromium-containing polymerization catalysts and are especially suited for chromium(III)acetylacetonate catalysts since water is not reintroduced by the use of this chromium source when it is dry blended with the porous support prior to thermal activation to produce the catalyst. Ethylene polymers of melt index in excess of about eight without hydrogen modification may be produced.

Examples of ketals of the formula $RC(OR)_2R$ are: 2,2-dimethoxypropane, 2,2-dimethoxybutane, 2,2-diethoxypropane, 2-methoxy-2-ethoxypropane, and the like.

Resins of melt index greater than about eight are obtained when a ketal is used to remove water according to the following process:

(1) Water removal from a washed hydrogel or hydrocogel by either of two ways: (a) by leaching with water miscible ketone, alcohol or mixtures thereof to remove bulk water and then treating the partially dehydrated product with a ketal whereby residual water is completely and irreversibly removed by a chemical reaction, or (b) by contacting the hydrogel or hydrocogel directly with a ketal. In general, heat and a catalytic amount of acid, if necessary, may be applied to facilitate the reaction of the ketal with water.

The resulting xerogel or xerocogel is then freed of absorbed ketone, alcohol, and ketal, and is then calcined at about 1000°–1850° F. prior to use as an olefin polymerization catalyst support. The concentration of zirconium ($ZrO_2$) in a xerocogel is in the range 0.1–67.5 wt.%, but preferably is between 2–3 wt.%.

(2) The preferred use of a zirconia-silica xerocogel is as a catalyst support prepared by coprecipitating hydrous zirconia and hydrous silica. This is accomplished by reacting a zirconium compound of the type $M_4Zr(C_2O_4)_4 \cdot nH_2O$ where M is an alkali metal but preferably ammonium ion, n equals 0 to about 10, with a silicon compound of the type $A_2SiO_3$, where A is an alkali metal, in aqueous solution to a pH of between 5 and 9 by the addition of an acidic compound such as sulfuric acid. The resulting hydrocogel is then aged at ambient to 90° C. for at least one hour followed by washing with an aqueous liquid. Water is removed as described in 1, above.

The washing step effects reduction in the content of alkali metal acid-base salt by-products (typically sodium sulfate) formed during coprecipitation in the hydrocogel to negligible levels. Should excessive amounts of the alkali metal salt remain in the hydrocogel pores, collapse of the pores during calcination or catalyst activation might result. Removal of by-product alkali metal salts is preferably accomplished by washing the hydrocogel with water and an aqueous solution of at least one thermally decomposible salt which displaces the alkali metal salt which leaves no residue in the calcined xerocogel.

Selection of the thermally decomposible salt used in the washing step is not critical as long as the content of alkali metal by-product left in the hydrocogel pores is reduced to negligible levels. Suitable thermally decomposible salts include ammonium nitrate, ethylenediamine diacetate and ammonium carbonate. Further, it has been found that washing with water alone provides acceptable results if sufficient water is used.

(3) A chromium(II), chromium(III) or chromium(VI) compound as the active polymerization ingredient is dry blended with the xerogel or xerocogel and if necessary the composite may be activated by heat in nitrogen, followed by dry air treatment in a fluid bed or activated by heat in dry air. Activation temperatures above ambient up to 1750° F. are preferred. Examples of chromium(II) compounds are chromocene or cyclopentadienyl chromium ethoxide; examples of chromium(III) compounds are chromium(III)acetate, chromium(III)propionate and preferably chromium(III)acetylacetonate; examples of chromium(VI) compounds are chromium(VI)trioxide, ammonium dichromate, and bis-triphenylsilyl chromate.

EXAMPLE 1 (INVENTION)

This example illustrates the invention of preparing novel highly porous supports. In this invention a hydrocogel, containing zirconia from ammonium tetraoxalatozirconate, is dehydrated chemically and irreversibly with a ketal. The end result is the production of polyethylene resins of melt index greater than about eight with chromium type catalysts based on these novel highly porous supports.

A solution of 13 grams of ammonium tetraoxalatozirconate(IV)pentahydrate in 400 cc. deionized water (pH=4.5) was added at about 20° C. to a stirred solution of 400 grams of sodium silicate in 800 cc. of deionized water. Ammonia was liberated and a clear solution with a pH of 11.3 was obtained. Dilute sulfuric acid (12.75%) was then added until a pH of about 6.2 was reached. The resulting coprecipitate or hydrocogel was then aged for at least one hour, for example seven hours, at about 90° C. while maintaining the pH at 6.3 with additional dilute sulfuric acid. Following aging, the hydrocogel was collected by filtration and washed first with deionized water, a solution of 1% ammonium nitrate, and finally with deionized water.

The washed hydrocogel was partially dehydrated by extraction with acetone according to the invention. Residual water was then chemically reacted away by heating with 2,2-dimethoxypropane. By-product acetone and methyl alcohol were distilled until essentially pure ketal began to distill. The recovered xerocogel containing 2.7 wt.% zirconia was dry blended with chromium(III)acetylacetonate and activated by nitrogen fluidization at 1700° F. followed by dry air treatment at 1300° F. The polyethylene resin produced by this catalyst had a surprisingly high MI of 10.6 without the use of hydrogen during synthesis. A second resin batch had an MI of 12.4. These MI values exceed all published values in the prior art discussed above.

EXAMPLE 2 (INVENTION)

This example is similar to Example 1 except that the chromium source is chromium(VI)oxide and the xerocogel is completely dehydrated with 2,2-diethoxypropane.

The washed hydrocogel, prepared as described in Example 1, is partially dehydrated by extraction with acetone followed by complete dehydration with 2,2-diethyoxyethane. The dry xerocogel containing 2.7 wt.% zirconia is dry blended with anhydrous chromium(VI)oxide and made active in air at 1700° F. The polyethylene resin produced by this catalyst had a melt index greater than about 8.

EXAMPLE 3 (COMPARATIVE)

This example shows the negative effect on resin melt index when water is removed from the hydrocogel of Example 1 azeotropically with ethyl acetate.

The washed hydrocogel prepared as described in Example 1 was dehydrated azeotropically with ethyl acetate to yield a xerocogel containing 2.7 wt.% zirconia. A catalyst was prepared by dry blending the xerocogel with chromium(III)acetylacetonate and nitrogen fluidizing at 1700° F. followed by a dry air treatment at 1300° F. Ethylene polymerization gave a resin with an MI of 2.7, a value much lower than that presented in Example 1.

EXAMPLE 4 (COMPARATIVE)

This example shows the negative effect on resin melt index when zirconia is not coprecipitated with silica.

Dilute aqueous sulfuric acid (12.75%) was added to a stirred solution of 403 grams of sodium silicate in 509 cc deionized water (pH=11.7). When a pH of about 6.2 was reached, the slurry was aged by heating at least one hour with stirring at 80°-88° C. while maintaining the pH at 6.2 by additional dilute sulfuric acid. After aging, the hydrogel was recovered by filtration and was washed first with deionized water, a solution of 1% ammonium nitrate, and finally with deionized water in order to remove all soluble by-products.

The washed hydrogel was dehydrated according to the present invention, that is, by extracting or leaching bulk water with acetone followed by removal of residual water chemically by reaction with a ketal, 2,2-dimethoxypropane. This is accomplished by distilling a mixture of 2,2-dimethoxypropane and the partially dehydrated hydrogel until the pure ketal begins to distill. This occurs after the by-products of acetone and methyl alcohol have been removed by distillation. The silica xerogel was dry blended with chromium(III)acetylacetonate and activated at 1700° F. in nitrogen followed by dry air treatment at 1300° F. The polyethylene resin produced by this catalyst showed a low MI of 1.1.

EXAMPLE 5 (COMPARATIVE)

This example illustrates the adverse effect on resin melt index when the zirconia source is zirconium sulfate which is coprecipitated with silica followed by dehydration of the hydrogel with a ketal.

A solution of 8 grams zirconium sulfate $H_2ZrO(SO_4)_2 \cdot 3H_2O$ in 400 cc water (pH=2.0) was added to a solution of 400 grams sodium silicate in 800 cc water with stirring. A solution with a pH of 11.4 containing a small amount of precipitate was obtained. Filtration of this solution yielded a clear solution to which dilute sulfuric acid (12.75%) was added until a pH of 6.2 was reached. This pH was maintained while the coprecipitate was aged three hours at 80° C. After aging, the hydrocogel was recovered by filtration and washed as described. The washed hydrocogel was dehydrated with a ketal, 2,2-dimethoxypropane, as described in Example 1. The recovered xerocogel containing 2.2 wt.% zirconia was dry blended with chromium(III)acetylacetonate activated at 1700° F. in nitrogen and air treated at 1300° F. The polyethylene resin produced by this catalyst had a very low melt index of 0.2.

Examples 1 and 2 point to a unique combination. That is a catalyst obtained by combining a chromium compound with a hydrogel dehydrated chemically and irreversibly with a ketal, and containing zirconia from ammonium zirconium oxalate. Polyethylene resins are produced with melt indices that are greater than about eight.

The catalysts disclosed herein are useful for polymerizing 1-olefins of 2-8 carbon atoms and copolymerizing mixtures of these with 1-olefins of 2-20 carbon atoms.

TABLE 1

| Example No. | Wt. % $ZrO_2$ | $ZrO_2$ Source[a] | Method of Water Removal[b] | Chromium[e] Source | Resin Milled[f] Melt Index |
|---|---|---|---|---|---|
| 1 | 2.7 | $NH_4ZrOx$ | acetone/2,2-DMP[c] | $Cr(AcAc)_3$ | 10.6 (12.4) |
| 2 | 2.7 | $NH_4ZrOx$ | acetone/2,2-DEP[d] | $CrO_3$ | >10 |
| 3 | 2.7 | $NH_4ZrOx$ | EtOAc azeotrope | $Cr(AcAc)_3$ | 2.7 |
| 4 | None | None | acetone/2,2-DMP | $Cr(AcAc)_3$ | 1.1 |
| 5 | 2.2 | $OZr(SO_4)$ | acetone/2,2-DMP | $Cr(AcAc)_3$ | 0.2 |

[a]$NH_4ZrOx$ is ammonium tetraoxalatozirconate(IV)hydrate; $OZr(SO_4)$ is zirconyl sulfate.
[b]From hydrogel or hydrocogel.
[c]Bulk water removed with acetone; residual water removed by an irreversible chemical reaction with 2,2-dimethoxypropane.
[d]2,2-DEP is 2,2-diethoxypropane.
[e]The active polymerization ingredient; $Cr(AcAc)_3$ is chromium(III)acetylacetonate.
[f]Polyethylene resin milled melt index determined according to ASTM D1238-62T Condition E. Polymerization conditions: 225° F., 550 psig, no hydrogen, and 2900 cc isobutane. The melt index of each recovered resin was compared at a productivity level of about 2000 g resin/g catalyst.

EXAMPLE 6 THE WASHING STEP CAN BE CARRIED OUT WITH VARIOUS AQUEOUS LIQUIDS

This example demonstrates that the hydrocogel can be washed with any of a variety of aqueous liquids, or with water alone, prior to dehydration.

A hydrocogel containing 2 wt.% zirconium (nominal) was prepared according to Example A of U.S. Pat. No. 4,246,137, except for the washing step. A single batch of the hydrocogel was washed five times with water and divided into five fractions. The fractions were slurried with a washing agent comprising water alone, a 1% aqueous solution of ethylenediamine diacetate, a 1% aqueous solution of ammonium carbonate, and a 1% aqueous solution of ammonium nitrate, respectively. Each slurry was then filtered to recover the hydrocogel which was then washed five times more with aliquots of the washing agents.

Final washing of each fraction with water revealed that essentially undetectable amounts of sodium sulfate were present in each case. The five washed hydrocogel fractions were then dried by azeotropic distillation with ethyl acetate, as in Example A of U.S. Pat. No. 4,246,137.

Surface area and pore volume data for each fraction (see Table 2, below) showed good agreement within experimental error, that the agent used in the washing step is not critical as long as the alkali metal salt is removed.

TABLE 2

| Hydrocogel | ← $ZrO_2 \cdot SiO_2$, 2 wt. % Zr → | | | | | |
|---|---|---|---|---|---|---|
| Washing | $H_2O$ | $H_2O$ 1% $(H_2NCH_2)_2 \cdot (OAC)_2$ | $H_2O$ 1% $(NH_4)_2CO_3$ | $H_2O$ 1% $NH_4NO_3$ |
| | $H_2O$ | $(OAC)_2$ | $H_2O$ | $H_2O$ |

TABLE 2-continued

| Water Removal | ← azeotropically with ethylacetate → |
| Conditioning | ← 300° F., vacuum → |
| Surface Area - m²/g (B.E.T.) | 363 | 360 | 355 | 387 |
| N₂ Pore Volume, cc/g | 2.35 | 2.73 | 2.44 | 2.30 |

I claim:

1. An olefin polymerization catalyst prepared by the steps of:
   a. reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH of at least 11 and then adding an acidic material to a pH of about 5–9, to produce a hydrocogel;
   b. aging said hydrocogel at a temperature between about ambient to 90° C. for at least one hour;
   c. washing said hydrocogel of b with an aqueous liquid;
   d. partially dehydrating the resulting washed hydrocogel of c by azeotropic distillation by mixing with a compound capable of forming an azeotrope with water or by washing the hydrocogel with a water miscible solvent to produce a substantially water-free, large pore volume zirconia-silica catalyst support;
   e. removing residual water from the product of d by chemically reacting this water with a ketal of the formula $RC(OR)_2R$ in which R is the same or different and is hydrogen or an alkyl group of 1–5 carbon atoms;
   f. calcining the resulting zerocogel at a temperature of about 1000°–1850° F. preparatory to its use as an olefin polymerization catalyst support;
   g. introducting a chromium compound onto said calcined support of f; and
   h. activating to produce an active polymerization catalyst.

2. The catalyst of claim 1 wherein said acidic compound in said aqueous solution is sulfuric acid, hydrochloric acid or ammonium sulfate.

3. The catalyst of claim 1 wherein said ketal comprises 2,2-dimethoxypropane.

4. The catalyst of claim 1 wherein said ketal comprises 2,2-dimethoxybutane.

5. The catalyst of claim 1 wherein said ketal comprises 2,2-diethoxypropane.

6. The catalyst of claim 1 wherein said ketal comprises 2-methoxy-2-ethoxypropane.

7. The catalyst of claim 1 wherein said washing step (c) is carried out with an aqueous liquid comprising at least one of water and an aqueous solution of a thermally decomposible salt.

8. The catalyst of claim 7 wherein said thermally decomposible salt is selected from the group consisting of ammonium nitrate, ammonium carbonate, and ethylenediamine diacetate.

9. A catalyst support prepared by the steps of:
   a. reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH of at least 11 and then adding an acidic material to a pH of about 5–9, to produce a hydrocogel;
   b. aging said hydrocogel at a temperature between about ambient to 90° C. for at least one hour;
   c. washing said hydrocogel of b with an aqueous liquid;
   d. partially dehydrating the resulting washed hydrocogel of c by azeotropic distillation by mixing with a compound capable of forming an azeotrope with water or by washing the hydrocogel with a water miscible solvent to produce a substantially water-free, large pore volume zirconia-silica catalyst support;
   e. removing residual water from the product of d by chemically reacting this water with a ketal of the formula $RC(OR)_2R$ in which R is the same or different and is hydrogen or an alkyl group of 1–5 carbon atoms; and,
   f. calcining the resulting zerocogel at a temperature of about 1000°–1850° F. prepatory to its use as an olefin polymerization catalyst support.

10. The catalyst support of claim 9 wherein said acidic compound in said aqueous solution is sulfuric acid, hydrochloric acid or ammonium sulfate.

11. The catalyst support of claim 9 wherein said ketal comprises 2,2-dimethoxypropane.

12. The catalyst support of claim 9 wherein said ketal comprises 2,2-dimethoxybutane.

13. The catalyst support of claim 9 wherein said ketal comprises 2,2-diethoxypropane.

14. The catalyst support of claim 9 wherein said ketal comprises 2-methoxy-2-ethoxypropane.

15. The catalyst support of claim 9 wherein said washing step c is carried out with an aqueous liquid comprising at least one of water and an aqueous solution of a thermally decomposible salt.

16. The catalyst support of claim 15 wherein said thermally decomposible salt is selected from the group consisting of ammonium nitrate, ammonium carbonate, and ethylenediamine diacetate.

* * * * *